(12) United States Patent
Ganesh

(10) Patent No.: US 6,453,028 B1
(45) Date of Patent: Sep. 17, 2002

(54) DYNAMIC TRAFFIC MANAGEMENT IN AN INTELLIGENT NETWORK OF A TELEPHONE SYSTEM

(75) Inventor: Tinniam Venkataraman Ganesh, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/514,237

(22) Filed: Feb. 28, 2000

(51) Int. Cl.[7] .............................................. H04M 15/00
(52) U.S. Cl. ............................. 379/112.04; 379/112.05; 379/112.01; 379/133
(58) Field of Search ................................ 379/221, 220, 379/229, 230, 231, 112.01, 112.04, 112.06, 112.1, 133, 137, 138, 139

(56) References Cited

U.S. PATENT DOCUMENTS

| | | | | |
|---|---|---|---|---|
| 4,979,118 A | * | 12/1990 | Kheradpi | 379/112 |
| 5,581,610 A | * | 12/1996 | Hooshiari | 379/133 |
| 5,778,057 A | * | 7/1998 | Atai | 379/220 |
| 5,898,672 A | * | 4/1999 | Ginzboorg | 370/236 |
| 5,930,348 A | * | 7/1999 | Regnier et al. | 379/112 |
| 6,018,519 A | * | 1/2000 | Ginzboorg | 379/230 |
| 6,205,212 B1 | * | 3/2001 | Swale | 379/133 |
| 6,259,776 B1 | * | 6/2001 | Hunt | 379/113 |

FOREIGN PATENT DOCUMENTS

| | | | | |
|---|---|---|---|---|
| CA | 5930348 | | 7/1999 | 379/221 |
| FI | 6018519 | | 1/2000 | 370/236 |

* cited by examiner

Primary Examiner—Curtis Kuntz
Assistant Examiner—Rexford N Barnie

(57) ABSTRACT

A dynamic traffic management method and apparatus is provided for intelligent network (IN) systems. This invention provides for dynamic, real-time Traffic Management of the SSP by the SCP in an IN without manual intervention by telecommunications system technicians. The traffic management issues are moved from the switch to an intelligent network node, thereby furthering the spirit of intelligent networks.

12 Claims, 3 Drawing Sheets

DYNAMIC TRAFFIC MANAGEMENT IN AN INTELLIGENT NETWORK OF A TELEPHONE SYSTEM

TECHNICAL FIELD

This invention relates to traffic management in telephone systems and more particularly to dynamic traffic management in an intelligent network (IN) of a telephone system.

BACKGROUND OF THE INVENTION

In presently operating systems, as in European Telecommunication Standardization Institute (ETSI)-INAP, or ITU (CS-IR and CS-2) Traffic Management is manually initiated when the service or network management center has detected a congestion situation or any other situation that requires manually initiated controls. In this situation the personnel at the Network Management Center would have to make a decision as to whether the number of failed calls over specific routes exceeded limits, before invoking the appropriate service logic at the SCP to send a Call Gap command and/or an ActivateServiceFiltering (ASF) command to filter calls over specific routes.

Alternatively, with the known ETSI-INAP operations, the SCP can make a decision for Automatic Call Congestion through indirect methods such as arming EDP-4R in every IN call and thereafter keeping a counter at the SCP's end in order to make the decision on the number of failed calls over a period of time before deciding to send a CallGap or ASF. The filtering criteria is done either based on the CalledAddressValue and/or Service Key when the triggering criteria is met, after the call hits any of the TDPs—TDP2, TDP3, TDP4 etc. With ITU CS-IR TDP4 can be armed in a Notification mode, which can then be used to monitor failed calls over a route. However these methods would unnecessarily increase the traffic over SS7 link between SSP and SCP.

Abbreviations used herein:
ASF—Activate Service Filtering
ASN-1—Abstract Syntax Notation Number One
A info—Analyze Information
A'd info—Analyzed Information
BCSM—Basic Call State Model
CS1—Capability Set 1
CS1—Capability Set 1
CS2—Capability Set 2
EDP—Event Detection Point
ERBCSM—Event Report BCSM
INAP—Intelligent Network Application Protocol
IN—Intelligent Network
ITU—International Telecommunication Union
RRBCSM—Request Report BCSM
RSF—Route Select Failure
SCP—Service Control Point
SS7—Signaling System #7
SSP—Service Switching Point
TC—Transaction Capabilities
TDP—Trigger Detection Point

SUMMARY OF THE INVENTION

Briefly stated, in accordance with one aspect of the invention, the foregoing problem of the art is overcome and an advance in the art is achieved by providing a method of traffic management using an intelligent network node, such as a Service Control Point, (SCP). This method provides a way by which an SCP can make an intelligent decision by monitoring the traffic over specified routes.

In accordance with another aspect of the invention, the aforementioned problems are overcome and an advance in the art is achieved by providing a method and apparatus for managing call traffic in a system having a service switching point (SSP) connected to a service control point (SCP) comprising the steps of: sending a traffic monitoring initiation request from the SCP to the SSP; monitoring call traffic at the SSP according to the traffic monitoring request; sending a response to the SCP including results of said monitoring; determining from said results if traffic management needs to be applied; and if traffic management needs to be applied, applying traffic management.

DETAILED DESCRIPTION

Figure 1:
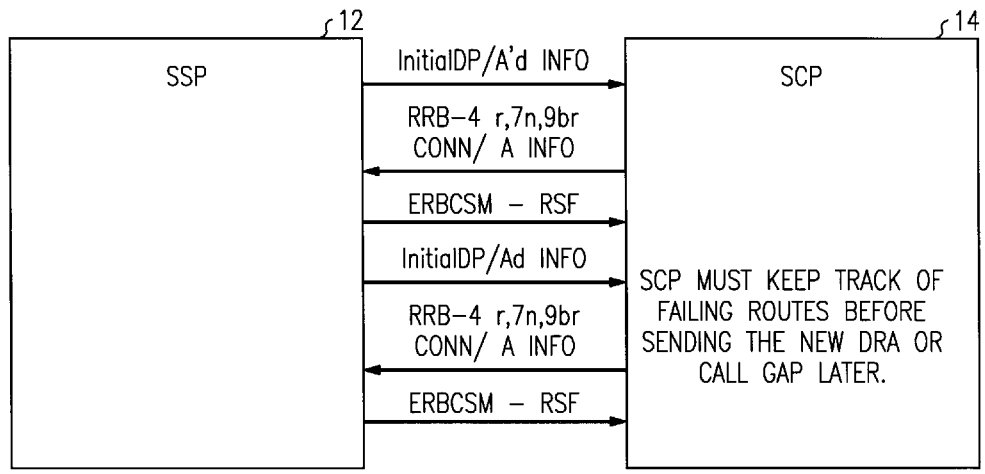
FIG. 1 is a diagram illustrating traffic management using known INAP operations.

FIG. 1 shows a flow diagram of information communications in an ETSI INAP system 10 between a SSP 12 and a SCP 14 during an INAP call traffic management operation using presently existing techniques. First systems personnel send an InitialDP and/or analyzed information message to SCP 14. The InitialDP message is an invitation to arm an event detection point, such as EDP-4R, in every IN call and thereafter keep a count at the SCP's end in order to make the decision on the number of failed calls over a period of time. SCP 14 responds with a request for a report on the basic call state model, especially requesting reports for data items 4r, 7n and 9br. SCP 14 also requests analyzed information for the next connect operation from SSP 12. In response, SSP 12 sends an event report on the basic call state model route select failures (ERBCSM-RSF). After sending the ERBCSM-RSF, SSP 12 sends another InitialDP and/or analyzed information message to SCP 14, which starts another process to obtain a subsequent ERBCSM-RSF. SCP 14 keeps track of the failing routes before sending a new DestinationRoutingAddress (DRA) sending a Call Gap later after gathering more data. As shown, there are many such message sequences between SSP 12 and SCP 14, thereby heavily loading the SS7 connections between them. This is the state of the art before the present invention.

Figure 2:
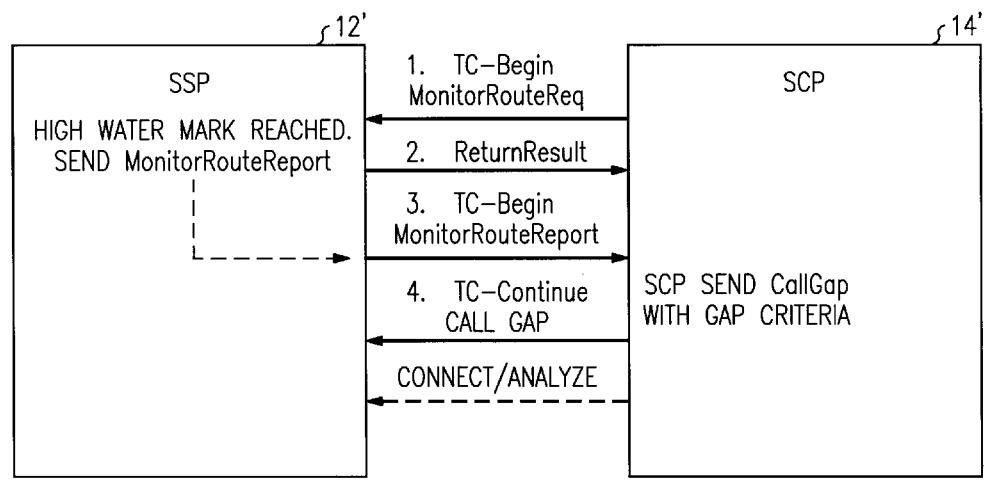
FIG. 2 is a diagram illustrating traffic management using operations according to the present invention.

As shown in FIG. 2, a method 200 that does not have the disadvantage of burdening the SS7 connection between SSP 12' and SCP 14'. SSP 12' and SCP 14' are very similar to SSP12 and SCP14 in FIG. 1, but have software to provide operation according to the present invention. The new method 200 for system 10' has SCP 12' send a non-call related operation MonitorRouteRequest (new) in which the SCP 12' specifies the route/route list to be monitored. This operation will have parameters which can request the SSP 12' to either inform the SCP 14' when a high watermark of failures has been reached at the SSP 12' (shown in FIG. 3) or to inform SCP 14' of the number failed calls over the specified route(s) within a specified interval during a particular time of day (shown in FIG. 4). This is done by the SCP 14' requesting the SSP 12' to dynamically arm DP4 (routeSelectFailure) for a particular set of route/routeList and incrementing a counter whenever calls over the specified route hits this particular DP. This is not equivalent to the arming of a TDP-4 statically. The SCP 14' requests the SSP 12' to increment a routeSelectFailed counter whenever a call over a particular route fails. When the monitoring criteria is satisfied the SSP 12' sends a MonitorRouteReport in a TC-Begin with either the number of routeSelectFailures for a particular interval or by filling in the parameter indicating that the high watermark has been reached. The SCP 14' can now decide to send either a CallGap or and ASF with the appropriate filtering criteria. The filtering criteria can now be based on the number of failed calls in the specified duration because of the information gathered in either a single report or a small number of reports. The SCP 14' can have service logic to calculate the number of calls that should go through and the number of calls which need to be gapped/filtered. The overall result is that the SCP 14' has more real time control of traffic problems in a switch as detected at SSP 12'. The gapping/filtering of calls are dynamic and can be done without human operator intervention. Alternatively, the SCP 14' also uses this information when sending the Connect/Analyze Information Operation to the SSP 12'. Because of the failed route information, the SCP 14' can avoid those DRAs (DestinationRoutingAddress) which would otherwise go over routes that have a high probably of failing due to network congestion. In such a case, an alternative route is sent in the DRA in the Connect/Analyze Information operation. This will ensure that failure rate of IN calls failing due to network congestion is low and that network loads are maintained within reasonable limits, thereby allowing a greater percentage of calls to be completed by system 10'. Such a service can also be used for Automatic Call Distribution (ACD) over routes which are liable to face network congestion to complete a higher percentage of the ACD calls during times of network congestion.

The MonitorRouteRequest is a Class 1 operation, meaning that both errors and ReturnResults can be sent for the operation. This operation is a non-call related operation, and should not be sent in the context of the call.

Figure 3:
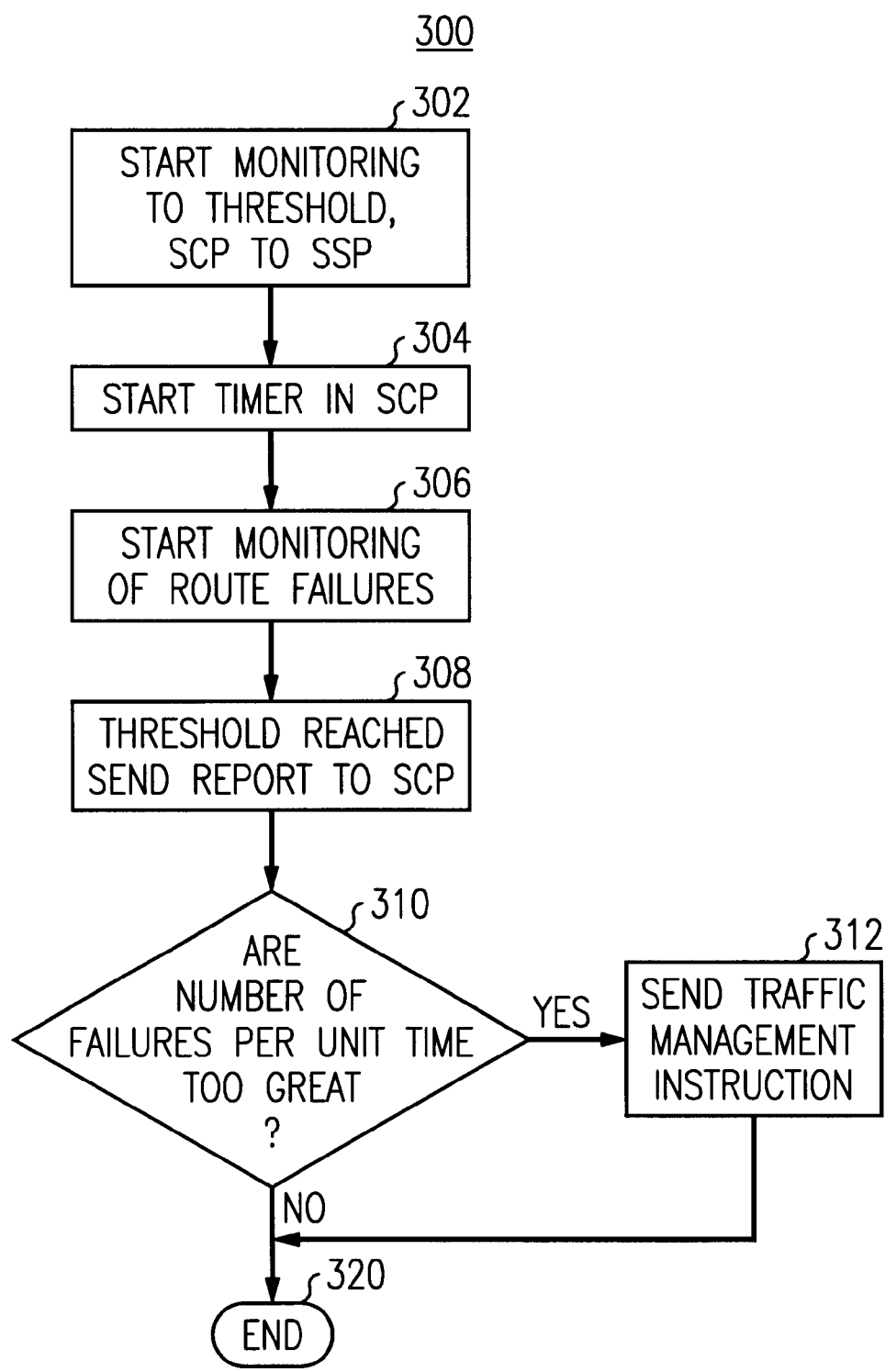
FIG. 3 is flow diagram of a threshold based traffic management sequence.

FIG. 3 shows a threshold based traffic management sequence. The SCP 14' communicates a start threshold monitoring instruction to the SSP 12' in step 302. In step 304 a timer is started in SCP 14'. The SSP 12' begins monitoring of route failures in step 306. If the SSP 12' determines that the threshold has been reached in step 308, a report is sent to the SCP 14'. A decision is made in step 310 by SCP 14' of whether the number of failures is too great per unit of time. A "YES" decision results in a traffic management instruction being sent in step 312. A "NO" decision terminates the logical process at END step 320.

Figure 4:
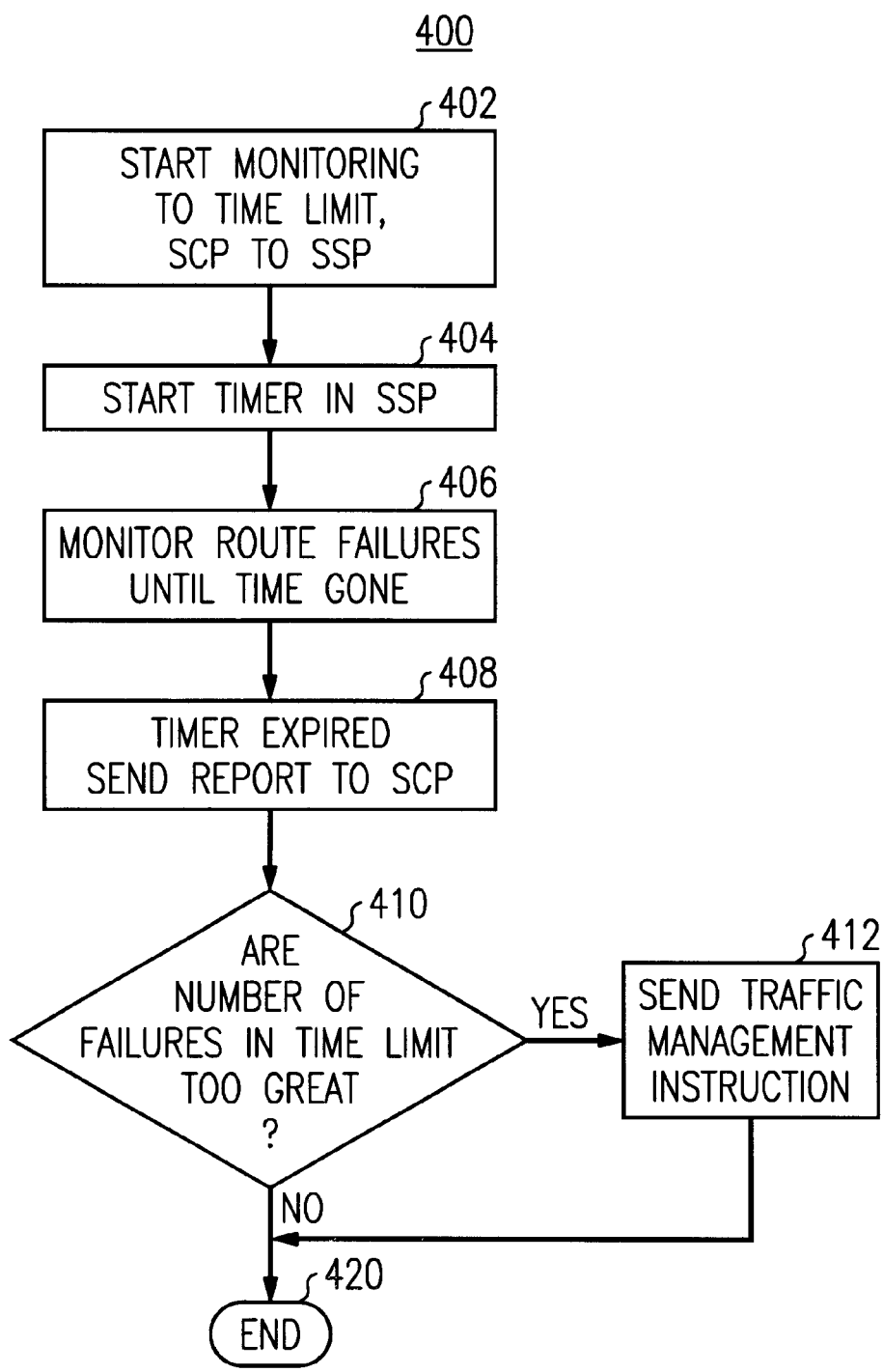
FIG. 4 is a flow diagram of a time duration traffic management sequence.

FIG. 4 shows a time duration based traffic management sequence. Beginning in step 402, SCP 14' communicates an instruction to the SSP 12' to start monitoring to a time limit. In step 404 a timer is started in SSP 12'. As indicated in step 406 the SSP 12' monitors route failures until the time limit expires and upon time limit expiration, in step 408, sends a report to the SCP 14'. A decision is made in step 410 by SCP 14' of whether the number of failures within the time limit is too great. A "YES" decision results in a traffic manage-ment instruction being sent in step 412. A "NO" decision terminates the logical process at END step 420.

The following are technical definitions of the SCP function (SCF) and the SSP function (SSF) operating SSP 12' and SCP 14' to provide the method 200 and error messages also. The technical definitions are specified in ASN-1 (Abstract Syntax Notation #1) defined in CCITT X.208 (1999).

| Service Control Function (SCF) | Service Switching Function (SSF) Operation |
|---|---|
| MonitorRouteRequest<br>ARGUMENT<br><br>RESULT<br>ERRORS | ::= OPERATION<br><br>MonitorRouteRequestArg<br><br>{<br>MissingParameter,<br>SystemFailure,<br>TaskRefused,<br>UnexpectedComponentSequence,<br>UnexpectedParameter<br>} |
| Operation Timer | |
| Operation name | Timer     Value range |
| MonitorRouteRequest | T     Short (1 to 10 seconds)<br>Mrr |

| Argument Data Type | |
|---|---|
| MonitorRouteRequestArg | ::= SEQUENCE { |
|   routeList | [0] RouteList, |
|   correlationID | [1] CorrelationID, |
|   monitoringCriteria | [2] MonitoringCriteria, |
|   monitoringTimeout | [3] MonitoringTimeOut, |
|   startTime | [4] DateAndTime    OPTIONAL, |
|   extensions | [5] SEQUENCE SIZE (1..<br>numofExtensions) |
|     of | ExtensionField OPTIONAL |
| ...<br>...<br>} | |
| RouteList | ::= SEQUENCE SIZE (1..NOS) of<br>OCTET |
|   STRING (SIZE(minRouteListLength<br>  maxRouteListLength)) | |
| -- Indicates a list of trunk groups or a route index | |
| MonitoringCriteria | ::= CHOICE { |
|   threshold | [0] Integer4 |
|   interval | [1] INTEGER (-1..32000) |
| } | |
| MonitoringTimeOut | ::= CHOICE { |
|   duration | [0] Duration, |
|   stopTime | [1] DateAndTime |
| } | |

MonitorRouteRequest procedure

When receiving this operation, the SSF monitors specified routes for DP4 hits (RouteSelectFailure). The SSF transfers the results of the operation either when a certain threshold is reached (Monitoring Criteria) or when the stop time is reached.

Parameters:

1. RouteList: This parameter is used to specify the outgoing trunk group to monitor. A sequence of routes may also be provided 2. CorrelationID: This parameter is used by the SCF to associate the MonitorRouteRequest with the MonitorRouteReport sent by the SSF.

3. MonitoringCriteria: This parameter specifies when the monitoring results are to be sent to the SCP.

A. threshold—This parameter specifies that the report should be sent whenever the threshold is exceeded.

B. interval—This parameter indicates that the monitoring report should be sent at the expiration of the interval timer.

4. MonitoringTimeout: This parameter indicates the duration, during which the monitoring should be active.

A. duration—If the duration timer expires then the monitoring should be removed.

A duration of '0' indicates that monitoring should be removed

A duration of '−1' indicates an infinite duration.

B. stopTime: When the stop time is met then the route monitoring is removed.

5. StartTime: This parameter defines when filtering is started. If "startTime" is not provided or was already met, the SSF starts monitoring immediately.

Invoking entity (SCF)
Normal Procedure
SCF precondition
1) Service Logic Program Instance (SLPI) decides to monitor traffic over specific routes.
SCF postconditions
1) Service Logic Program Instance (SLPI) starts an application timer to monitor the expected end of monitoring routes
2) The Service Control Functionality Management Entity (SCME) is in the state "Waiting for SSF MonitoringRouteReport".
Responding entity (SSF)
Normal procedure
SSF precondition:
1. None.
SSF postcondition:
1. The Service Switching Functionality Management Entity (SSME) Finite State Machine (FSM) is in the state "Non-call Associated Treatment".
Error handling
1. If the SSF detects an error with any of the defined error values then this error is reported to the SCF.

```
SSF - SCF Operation
 MonitorRouteReport          ::= OPERATION
    ARGUMENT
                              MonitorRouteReportArg
 Argument Data Type
 MonitorRouteReportArg        ::= SEQUENCE {
    routeCounters                 [0] RouteCountersValue,
    correlationID                 [2] CorrelationID
    extensions                    [3] SEQUENCE
SIZE(1..numofExtensions) of
                              ExtensionField OPTIONAL,
                                  ...
                                  ...
    }
 RouteCountersValue           ::= SEQUENCE SIZE(l..NOS)
RouteCountersAndValue
    RouteCountersAndValue     ::= SEQUENCE {
       route                      [0]OCTET STRING
                                  size(minRouteListLength..
maxRouteListLength),
       counterID                  [1] CounterID,
       counterValue               [2] Integer4
    }
```

MonitorRouteReport Procedure

General description

This operation is used to report the values of route list counters of a previous MonitorRouteRequest operation.

Parameters:

1. routeCounters: The parameter contains the count of failed calls over selected routes, during the monitoring period. It is a list of route counter identifications and the related value. If a threshold was specified for a particular route, then the counter value holds the specified threshold value.

2. correlationID: This parameter is used by the SCF to associate the MonitorRouteReport from a previously sent MonitorRouteRequest.

Invoking entity (SSF)
Normal Procedure
SSF precondition
1) Monitoring of routes is currently running and the interval timer has expired ;or 2) Monitoring of routes is running and the threshold value has been reached ;or
3) Monitoring has finished (duration time expired or stop time met) ;or
4) The operation MonitorRouteRequest is received and encounters an active route monitoring entity.
SSF postconditions
1) Monitoring of routes proceeds or is ended depending on the duration time.
Error handling: Operation related error handling is not applicable, due to class 4 operation.
Responding entity (SCF)
Normal procedure
SCF precondition:
1 ) Monitoring of routes is running.
2) The SCME is in the state "Waiting for SSF MonitorRouteRequest".
SCF postcondition:
The SCME forwards the received counter values to the SLPI.

4. Summary & Conclusion

Although this invention has been described with respect to a preferred embodiment, those skilled in the art may devise numerous other arrangements without departing from the scope of the invention as defined in the following claims.

What is claimed is:

1. A method for managing call traffic in a system having a service switching point (SSP) connected to a service control point (SCP) comprising the steps of:
   sending a traffic monitoring initiation request from the SCP to the SSP;
   monitoring call traffic at the SSP according to the traffic monitoring request prior to initiation of any traffic management by the SSP;
   sending a response to the SCP including results of said monitoring;
   determining from said results if traffic management needs to be applied;
   if traffic management needs to be applied, applying traffic management.

2. The method of claim 1, wherein said monitoring initiation request is a monitor route request.

3. The method of claim 1, wherein said monitoring initiation request is a Transaction Capabilities (TC)—Begin request.

4. A method for managing call traffic in a system having a service switching point (SSP) connected to a service control point (SCP) comprising the steps of:
   sending a traffic monitoring initiation request from the SCP to the SSP;
   monitoring call traffic at the SSP according to the traffic monitoring request prior to initiation of any traffic management by the SSP;
   sending a response to the SCP including results of said monitoring;
   determining from said results if traffic management needs to be applied;
   if traffic management needs to be applied, applying traffic management,
   wherein said monitoring initiation request is a monitor route request and said response to the SCP is monitor route report.

5. The method of claim 1, wherein said monitoring initiation request is a monitor route request and said response to the SCP is monitor route report with information that a high watermark of failures has been reached.

6. The method of claim 1, wherein:

said monitoring initiation request is a monitor route request;

said response to the SCP is monitor route report with information that a high watermark of failures has been reached; and said applying of network management step includes sending a call gap instruction to the SSP.

7. The method of claim 6, wherein said call gap criteria are sent along with the call gap instruction.

8. A method for managing call traffic in a system having a service switching point (SSP) connected to a service control point (SCP) comprising the steps of:

sending a traffic monitoring initiation request from the SCP to the SSP;

monitoring call traffic at the SSP according to the traffic monitoring request prior to initiation of any traffic management by the SSP;

sending a response to the SCP including results of said monitoring;

determining from said results if traffic management needs to be applied;

if traffic management needs to be applied, applying traffic management, wherein said monitoring initiation request is a TC-Begin request to monitor all failures for a set period of time and said response to the SCP is monitor report with information of the number of call failures during the preset time, which has expired.

9. The method of claim 1, wherein:

said monitoring initiation request is a TC-Begin request to monitor all failures for a set period of time;

said response to the SCP is monitor report with information of all failures during the set period of time; and said applying of network management step includes sending a call gap instruction to the SSP.

10. The method of claim 1, wherein:

said monitoring initiation request is a TC-Begin request to monitor all failures for a set period of time;

said response to the SCP is monitor report with information of all failures during the set period of time; and said applying of network management step includes sending a connect- and analyze information instruction that has an alternative route in a destination route address (DRA) data field to the SSP.

11. The method of claim 1, wherein:

said monitoring initiation request is a monitor route request;

said response to the SCP is monitor route report with information that a high watermark of failures has been reached; and said applying of network management step includes sending a connect- and analyze information instruction that has an alternative route in a destination route address (DRA) data field to the SSP.

12. An arrangement for managing call traffic in a system having a service switching point (SSP) connected by SS7 connections and signaling to a service control point (SCP) comprising:

means for sending a traffic monitoring initiation request from the SCP to the SSP;

means monitoring call traffic at the SSP according to the traffic monitoring request in response thereto prior to initiation of any traffic management by the SSP;

means for sending a response to the SCP including results of said monitoring;

means for determining from said results if traffic management needs to be applied; and means for applying traffic management if traffic management is needed to reduce route failures.

* * * * *